(12) United States Patent
Urade et al.

(10) Patent No.: US 6,272,644 B1
(45) Date of Patent: Aug. 7, 2001

(54) METHOD FOR ENTERING POWERSAVE MODE OF USB HUB

(75) Inventors: Masakazu Urade, Kyoto (JP); Eskandar Afshar, Cupertino; Liang Lin, San Jose, both of CA (US)

(73) Assignee: Matsushita Electrical Industrial Co., Ltd., Osaka (JP)

(*) Notice: Subject to any disclaimer, the term of this patent is extended or adjusted under 35 U.S.C. 154(b) by 0 days.

(21) Appl. No.: 09/226,778

(22) Filed: Jan. 6, 1999

(51) Int. Cl.[7] .................................................. G06F 13/00
(52) U.S. Cl. ........................... 713/320; 713/600; 710/129
(58) Field of Search ........................ 710/1–4, 52, 62–64, 710/100–101, 126–131; 713/300, 310, 320, 330, 340, 600, 601

(56) References Cited

U.S. PATENT DOCUMENTS

| | | | |
|---|---|---|---|
| 5,652,895 | * | 7/1997 | Poisner ................................ 713/322 |
| 5,884,086 | * | 3/1999 | Amoni et al. ........................ 713/300 |
| 5,935,224 | * | 8/1999 | Svancarek et al. ................... 710/63 |
| 5,958,027 | * | 9/1999 | Gulick .................................. 710/52 |
| 6,052,793 | * | 4/2000 | Mermelstein ........................ 713/340 |
| 6,085,325 | * | 7/2000 | Jackson et al. ...................... 713/300 |
| 6,105,143 | * | 8/2000 | Kim ..................................... 713/324 |
| 6,125,449 | * | 9/2000 | Taylor et al. ........................ 713/310 |

OTHER PUBLICATIONS

Anderson, D., *Universal Serial Bus System Architecture*, MindShare, Inc., Addison–Wesley Developers Press ISBN 0–201–46137–4 (1997).

Jaff, Kosar, *The USB Handbook*, Anabooks, Dan Diego, ISBN 0–929392–39–6 (1996).

Panasonic Semiconductor, MN5573 USB Hub Controller, Rev. 1.3 (Apr. 24, 1998).

\* cited by examiner

*Primary Examiner*—Christopher B. Shin
(74) *Attorney, Agent, or Firm*—Morrison & Foerster LLP

(57) ABSTRACT

A method of controlling a USB hub by a microcontroller, comprising the steps of sending a suspend request to the microcontroller from the USB hub; sending a stop clock request from the microcontroller to the USB hub in response to the suspend request; and stopping the USB hub controller clock in response to the suspend request; entry into a powersave mode by the microcontroller in response to the suspend request.

9 Claims, 7 Drawing Sheets

METHOD FOR ENTERING POWERSAVE MODE OF USB HUB

BACKGROUND OF THE INVENTION

1. Field of the Invention

The present invention relates in general to serial bus devices, and more particularly, to serial bus hub controllers.

2. Description of the Related Art

The development of the universal serial bus (USB) standard has allowed a significant improvement in the connection of peripheral devices to a personal computer (PC) by allowing for multiple peripheral devices to be connected to a PCI bus of the PC through a USB host controller. As shown in FIG. 1, devices, such as printers, monitors, keyboards, auxiliary storage drives and scanners may connect to the host device, usually a PC, through the USB host controller (2) in a tiered star topology. Typically, the USB host controller (2) is at the center of the star topology with the host computer (1) on the upper tier and the devices (3) on the lower tier. The USB host controller (2) connects to the PCI bus (not shown) of the host computer (1). The USB host controller (2) connects to the devices (3) via a root hub (10). As shown in FIG. 2, the root hub (10) has two major functional components: the hub controller (4) and the hub repeater (5). The hub controller (4) and the hub repeater (5) both connect to the PCI bus of the host computer (2) through the upstream port (6). The hub controller (4) issues enable and disable commands to the hub repeater (5). The hub repeater (5) connects the hub controller (4) to the devices (3) through downstream ports (7). The devices (3) include a USB bus interface (not shown) and a USB logical device (not shown) for communication with the USB hub repeater through the downstream port the device is connected to. The devices can also function as hubs, as illustrated by compound device (8) which has a hub (9) as part of the compound device. The compound device (8) allows multiple other devices (3) to be connected to the host computer (1). The compound devices have their own functionality, such as a keyboard which allows connection of a joystick. Additional hubs (46) may be connected to the downstream ports of the compound device (8) to expand the number of devices (3) connectable to the host computer (1). Additional details on the USB system are described in "Universal Serial Bus System Architecture" by Don Anderson, Mindshare, Inc., published by Addison-Wesley Developers Press, which is incorporated in its entirety by reference herein.

In the typical tiered star topology of the USB system peripheral devices are not capable of communicating directly. Instead, they communicate through the host device. In the USB system the hubs receive upstream information and, in an active mode, pass this information upstream in the direction of the host controller. The hubs pass downstream information to all of the enabled downstream ports. Thus, the hub "broadcasts" information to all of the enabled downstream ports.

While a USB device such as a USB monitor ordinarily can receive signals from the host device through the USB host controller, some currently available monitors do not include the necessary hardware to interface with a USB host controller. Some existing hubs with a compound device include a serial interface for communication with an external non-USB microcontroller. Unfortunately, a serial interface bus ordinarily does not provide for the ability to resume the clock received from the microcontroller. The serial interface between the USB hub and a microcontroller requires a clock signal be provided. As such, a typical USB suspend mode which stopped the clock signal would result in the inability of the microcontroller to send a resume request to the hub as the clock signal is required for communication between the hub and the microcontroller. Accordingly, a typical suspend mode cannot be entered as there is no way to wake up the hub once the clock signal has been stopped. While other functions of the hub can be shut down in a partial suspend mode, the need to provide clock signals for communication between the hub and the microcontroller increases the power consumed in such a partial suspend mode.

In some applications the lack of an ability to restart the clock from an external non-USB microcontroller limits the convenience and functionality of the hub. For example, when an external monitor is used which is controlled by hand held infrared (IR) remote controller device, the signals received from the remote controller device to activate the monitor's microcontroller cannot readily cancel the suspend mode of the host computer through the USB hub.

Accordingly, there is a need for an interface which allows an non-USB microcontroller controlled device to interface with a USB hub and to enable resume signals from the microcontroller to cancel the suspend mode of both the host computer and the hub.

SUMMARY OF THE INVENTION

The present invention provides a serial bus hub controller with device function including an interface for communication with a microcontroller. More particularly, the interface allows the serial bus hub controller to communicate with the microcontroller to enter a suspend mode and to wake up from the suspend mode. The serial bus hub controller requests the microcontroller to enter a suspend mode by asserting a suspend signal. The microcontroller responds by instructing the hub to stop its clock. The microcontroller then asynchronously stops its own clock. To resume the microcontroller instructs the hub to wake up. The hub responds by de-asserting a suspend signal. In response to the de-assertion of the suspend signal the microcontroller starts its clock. The microcontroller then de asserts a stop clock signal sent to the hub. This causes the hub to re-start its clock.

Therefore, the present invention provides an interface which allows an external device controlled by a non-USB microcontroller to interface with a USB hub. Resume signals are sent from the non-USB microcontroller and received by the USB hub while the hub is in a suspend mode with its clock turned off.

DETAILED DESCRIPTION OF THE PREFERRED EMBODIMENT

The present invention comprises interface between a microcontroller and a USB hub. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 3:
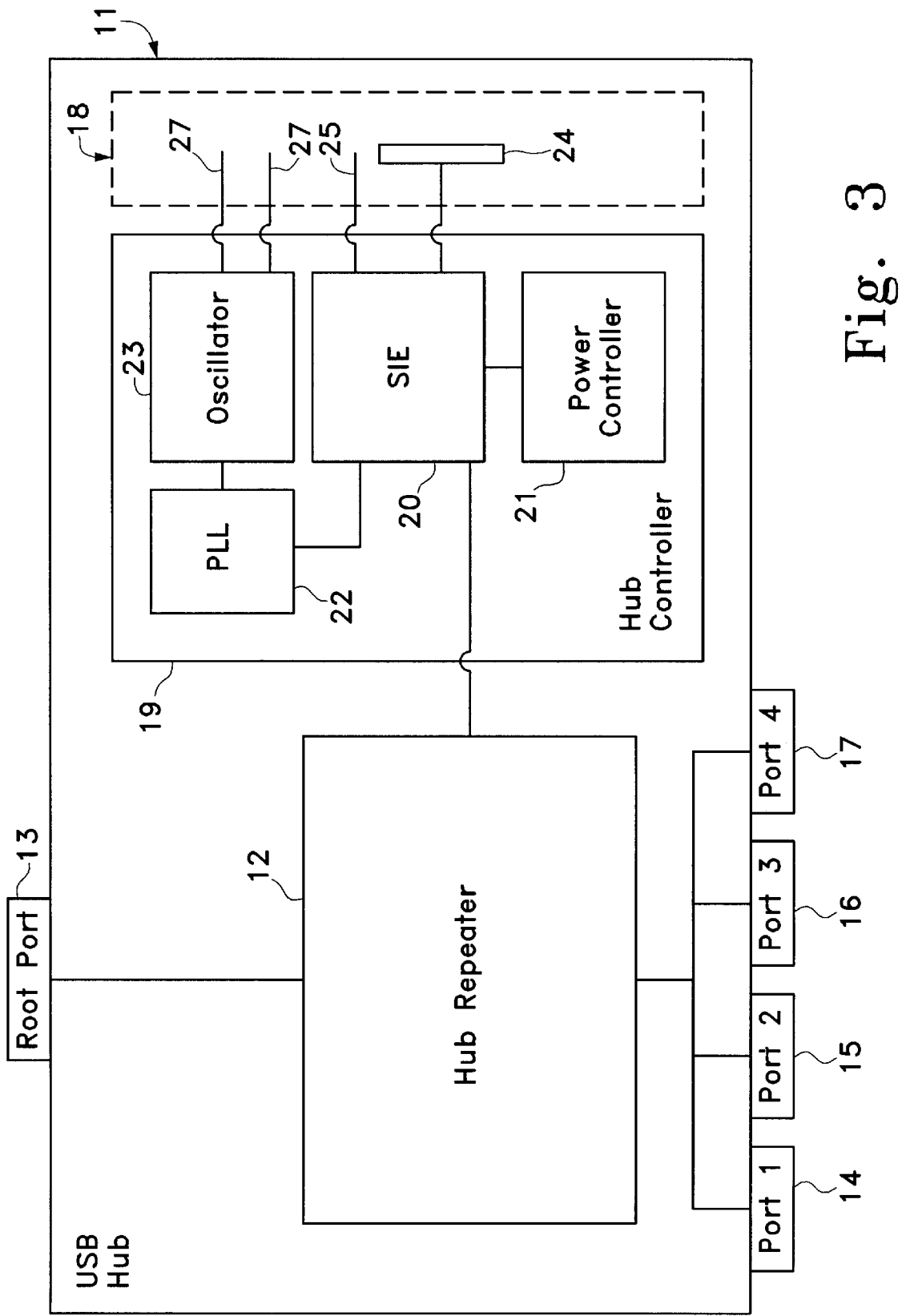
FIG. 3 is a generalized block diagram of a serial bus hub including a microcontroller interface, in accordance with the present invention.

FIG. 3 shows a generalized block diagram of a USB hub (11) in accordance with a presently preferred embodiment of the invention. The USB hub (11) includes a hub repeater (12), a root port (13), four downstream ports (14)–(17), a microcontroller interface (18), and a hub controller (19). The hub controller (19) includes a serial interface engine (SIE) (20), a power controller (21), a phase locked loop (PLL) (22), and an oscillator (23). The hub repeater (12) connects to the root port (13), the downstream ports (14)–(17), and to the SIE (20) of the hub controller (19). The microcontroller interface (18) includes an inter integrated circuit ($I^2C^{TM}$) slave interface bus (24) (SDA and SCL signals discussed with reference to FIG. 5), an interrupt (25), and oscillator inputs (27). In addition to connecting to the hub repeater (12), the SIE (20) also connects to the power controller (21), the $I^2C^{TM}$ slave interface bus (24), the interrupt (25), and to the PLL (22). The oscillator (23) connects the PLL (22) to the oscillator inputs (27).

The root port (13) allows the USB hub (11) to connect to a host computer (not shown) such as a PC. The downstream ports (14)–(17) allow the USB hub to connect to USB devices such as printers, keyboards, plotters or to a mouse. While the embodiment shown in FIG. 3 utilizes four downstream ports (14)–(17), alternate embodiments of the present invention could use more or fewer downstream ports depending on the desired level of connectivity for the intended application. Other examples of existing and future USB devices can also be connected to the USB hub through the downstream ports (14)–(17). The microcontroller interface (18) allows the USB hub (11) to connect to non-USB devices (not shown), such as monitors, which have their own internal microcontroller. The microcontroller interface (18) allows commands to be both sent and received from the microcontroller of an external device. The microcontroller interface (18) provides connection to non-USB devices, such as a monitor having a its own internal microcontroller, and supports additional functionality such as the ability to receive a resume request from such a device.

The hub repeater (12) manages port connectivity between the selected downstream functional device and a host computer connected to the root port (13). Downstream functional devices may be connected to either the downstream ports (14)–(17) or to the microcontroller interface (18).

The SIE (20) implements the USB protocol layer. It handles clock recovery, error checking, serial to parallel conversion, handshakes, cyclic redundancy (CRC) checking and generation, bit stuffing and destuffing, NRZI data encoding and decoding, packet identifier (PID) verification, data toggles, and sync detection. A more detailed description of the USB protocol layer is described in "The USB Handbook", by Kosar Jaff, Anabooks, San Diego, ISBN 0-929392-39-6, which is incorporated by reference herein.

The $I^2C^{TM}$ slave interface bus (24) implements the $I^2C$ protocol as a simple slave interface where the microcontroller is the master to the USB hub controller (19). The $I^2C^{TM}$ slave interface allows the USB hub controller (19) to interface with a microcontroller on a functional device by USB protocols. In this manner, the USB function can be added to an existing microcontroller. The microcontroller sends commands to the USB hub controller (19) through the $I^2C^{TM}$ slave interface bus (24). These commands are sent to the hub repeater (12) through the SIE (20). The hub repeater (12) sends these command signals to either the host computer connected to the root port (13), or to one of the functional devices connected to the downstream ports (14)–(17).

The USB hub controller (19) receives a clock signal through the oscillator input (27). The oscillator receives this clock signal and provides it to the PLL (22). The PLL (22) generates a high frequency clock signal from this lower frequency clock signal received from the oscillator. The PLL provides the high frequency clock signal to the SIE (20). The SIE uses this high frequency clock in performing its functions. By converting a low frequency signal received from the oscillator to a high frequency clock signal provided to the SIE the power dissipation of the USB hub controller (19) is reduced. In one embodiment of the present invention, the low frequency signal received from the oscillator (23) is 12-MHz and the high frequency signal output to the serial interface engine is 48-MHz. Other embodiments of the present invention could use other frequencies input from the oscillator and input to the serial interface engine.

The power controller (21) allows the USB hub controller (19) to support power mode settings as applied by an external device, either bus powered or self powered. Self powered means powered from a power source other than from another USB device connected to the root port (13) or the downstream ports (14)–(17). A self powered power source could include connection to an external AC power supply or to an internal battery. Four power control modes are available: self-powered hub, individual-port power control; bus-powered hub, individual-port power control; self powered hub, ganged-port power control; and bus-powered hub, ganged port power control.

The $I^2C^{TM}$ slave interface bus (24) and the interrupt (25) of the microcontroller interface (18) allow the microcontroller of the external device to send commands to the hub controller (19) and to the host computer connected to the root port (13). The microcontroller of the external device is the master to the USB hub controller (19). The USB hub controller (19) must issue an interrupt to send commands to the microcontroller. Interrupt requests are sent to the microcontroller through the interrupt (25).

In a typical USB system having a USB hub (11) connected to a host computer and a plurality of peripheral devices a suspend request from the host computer is passed to the USB hub (11). The USB hub passes this request to the USB peripheral devices. The USB hub (11) also tells the microcontroller to suspend. The microcontroller responds to this suspend request by instructing the USB hub (11) to suspend itself by suspending its clock using a stop clock signal. The microcontroller then asynchronously turns its own clock off.

If an external non-USB source, such as an IR remote control, instructs the microcontroller to turn on, the microcontroller sends a resume request to the USB hub (11) using a resume signal. The USB hub (11) relays this request to the host computer. In response to the received resume request the USB hub releases the suspend signal sent to the microcontroller. In response to the released suspend signal the microcontroller releases the stop clock signal sent to the USB hub and the process, discussed below in connection with FIGS. 5 and 6, is followed to wake up the microcontroller.

Figure 1:
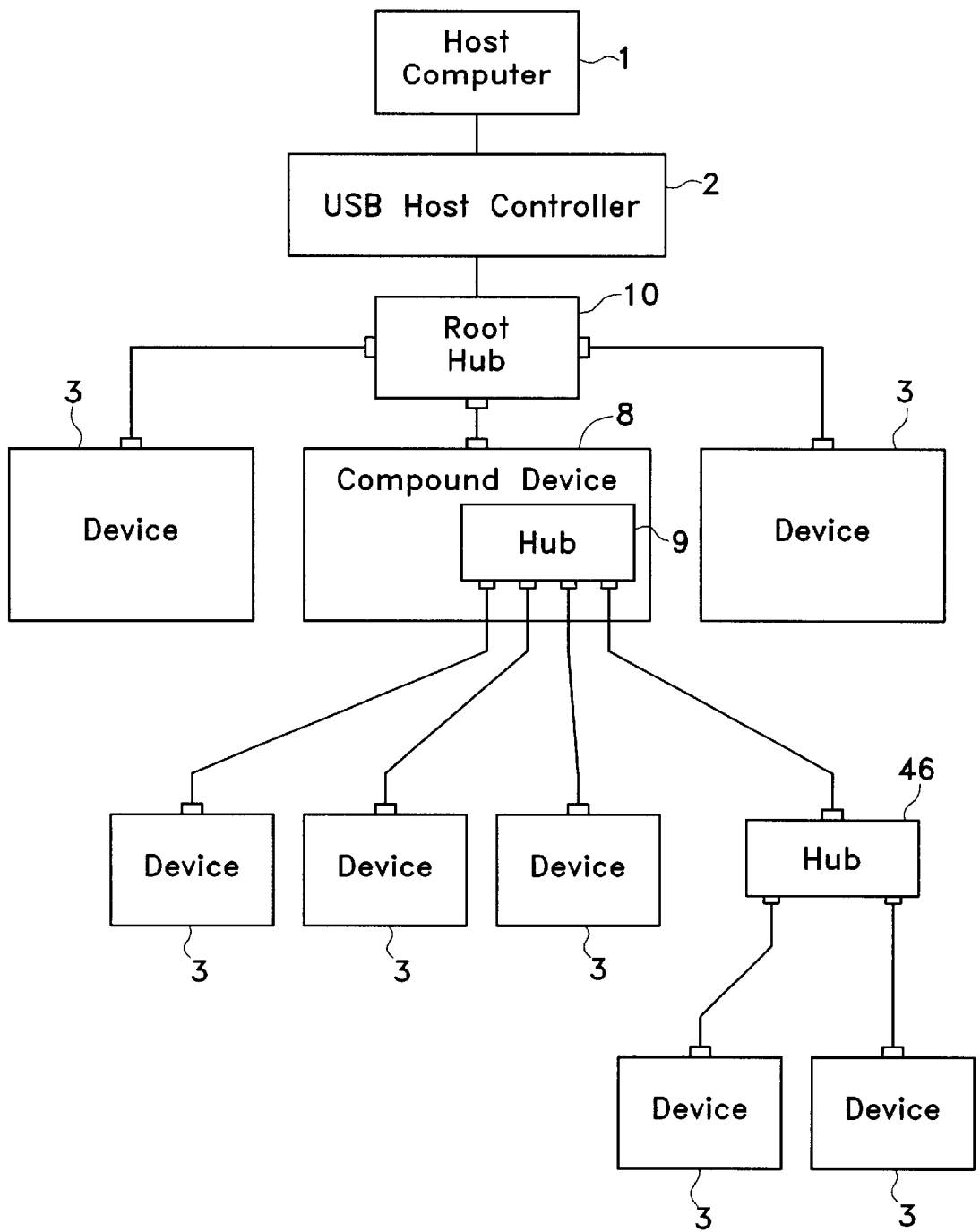
FIG. 1 is a genaralized block diagram of a conventional USB system.
Figure 4:
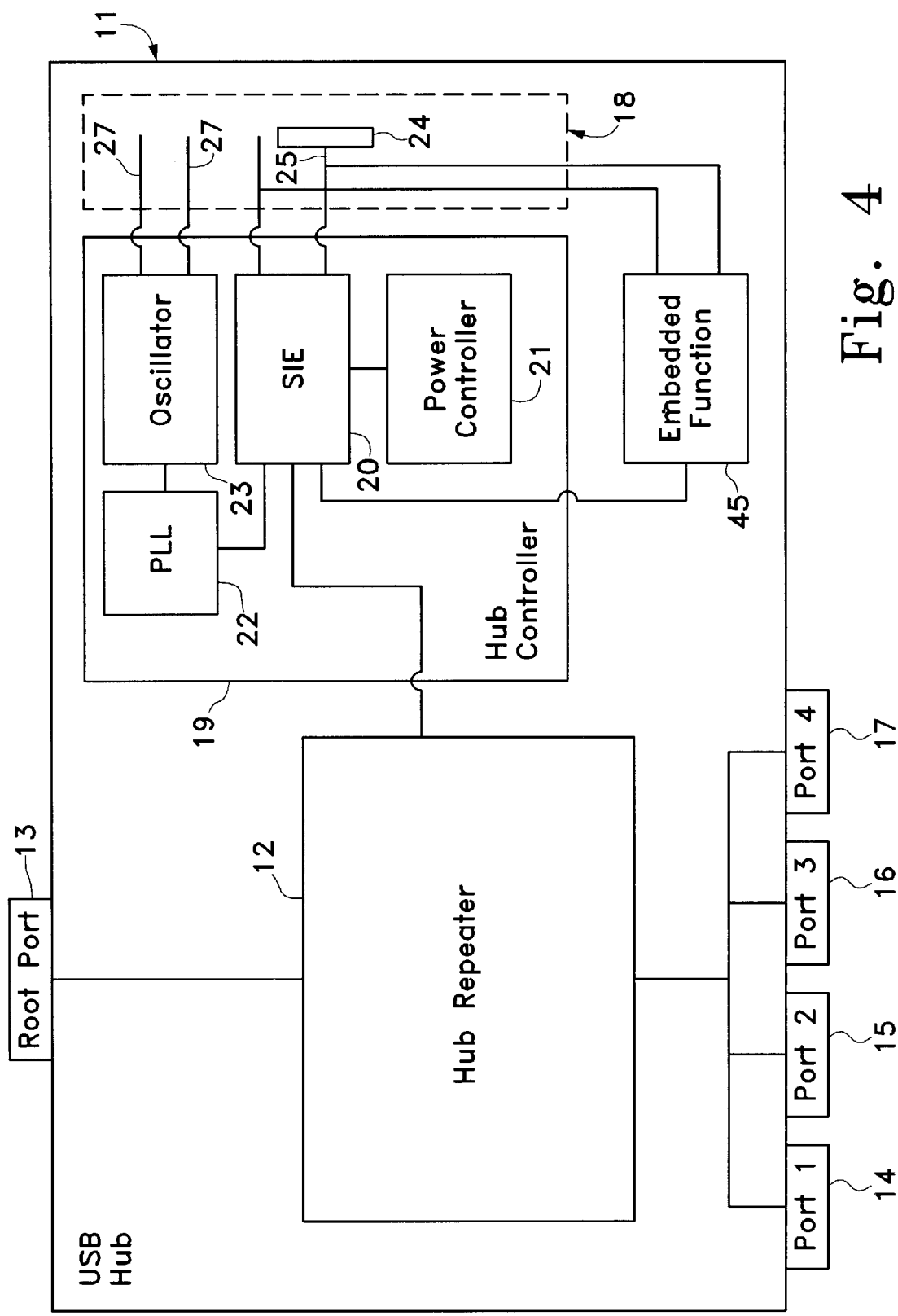
FIG. 4 is a generalized block diagram of a serial bus hub having an embedded function including a microcontroller interface, in accordance with the present invention.

FIG. 4 shows an alternate embodiment of the present invention where the USB hub (11) includes and embedded function (45). The embedded function (45) is connected to the SIE (20) of the hub controller (19). Additionally, the embedded function (45) is connected to the I²C™ slave interface bus (24) and the interrupt (25) of the microcontroller interface (18). The embedded function could be any type of function implemented by the device (3) described above in relation to FIG. 1, such as a mouse, keyboard, etc. Upstream signals from the embedded function (45) are sent to the SIE (20). These upstream signals are then sent to the hub repeater (12) which forwards them on to the host computer. Signals from the embedded function (45) intended for the microcontroller controlled device (not shown), are sent to the microcontroller controlled device by the I²C™ slave interface bus (24) of the microcontroller interface (18). The signal from the embedded function (45) intended to "wake up" the host computer is the resume signal.

Figure 2:
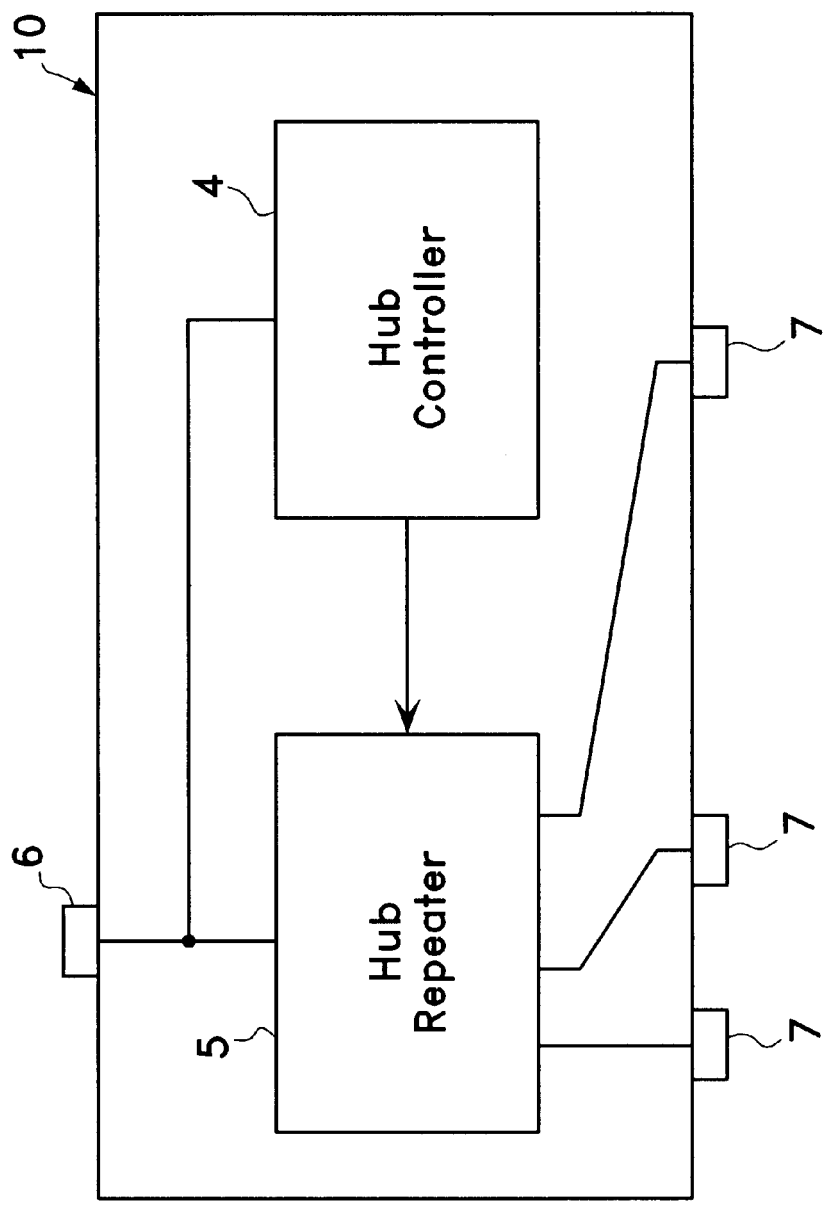
FIG. 2 is a generalized block diagram of a conventional USB hub.
Figure 5:
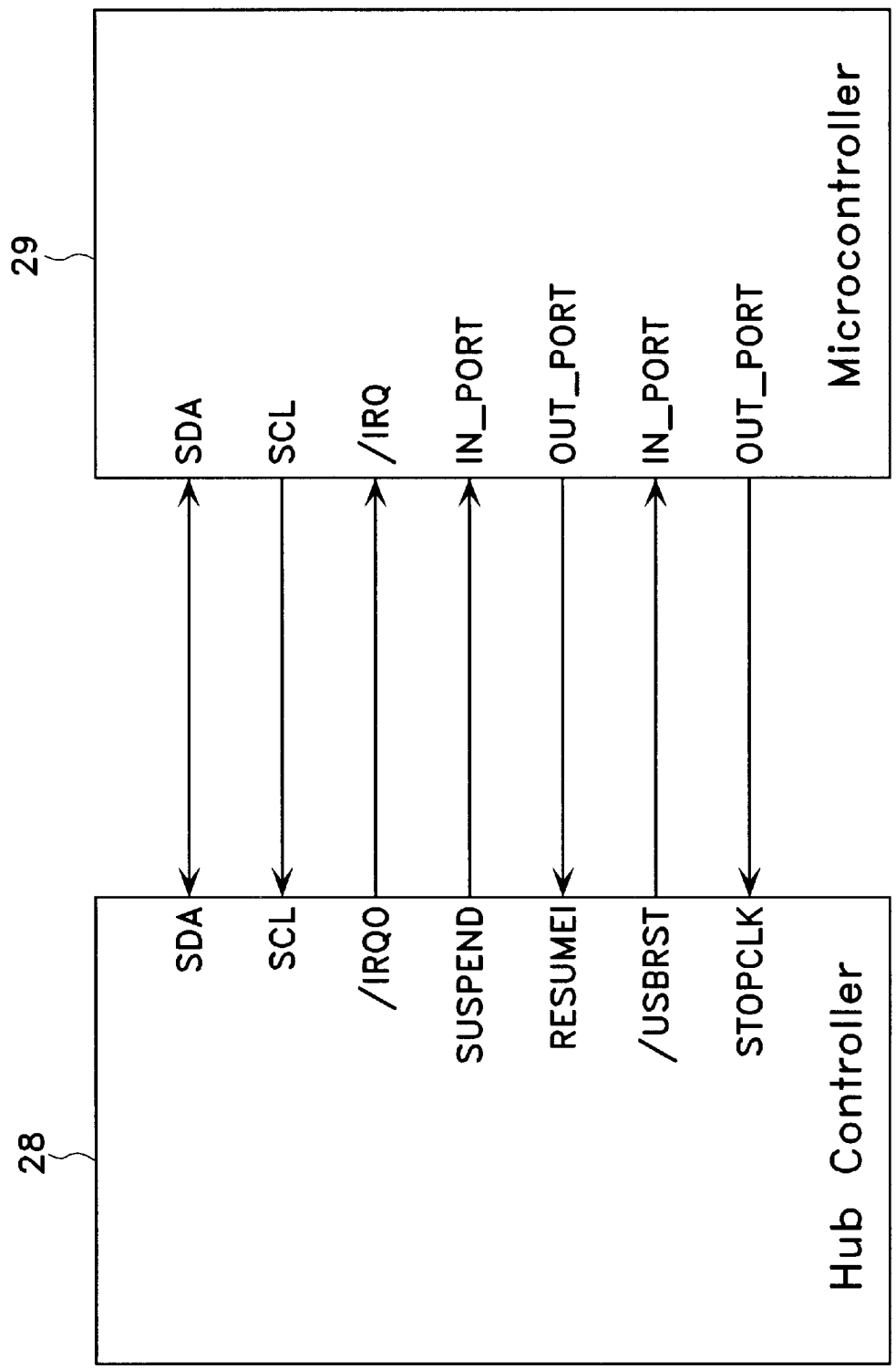
FIG. 5 is a generalized block diagram of the interface between the hub controller and the microcontroller, in accordance with the present invention.
Figure 6:
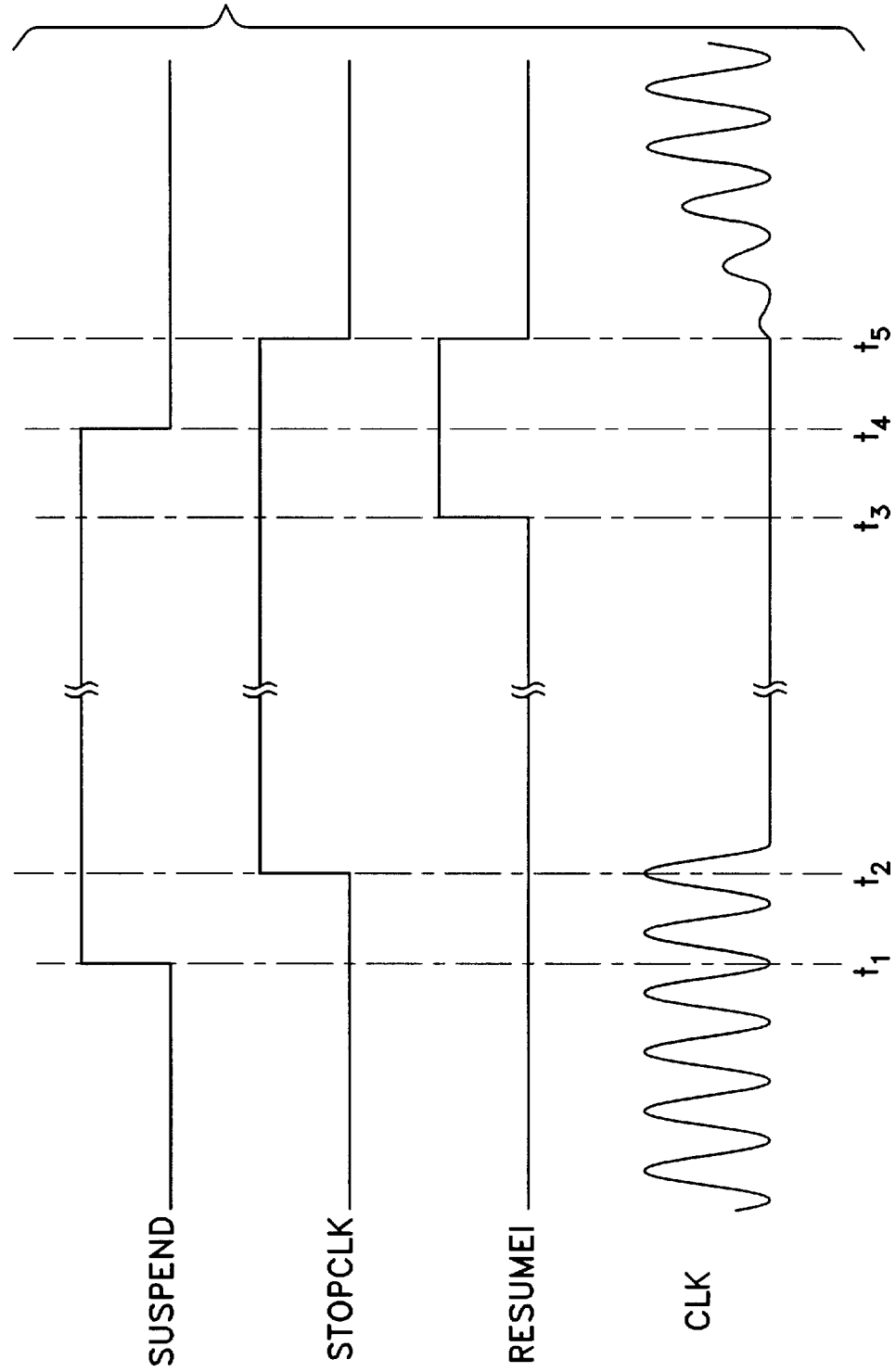
FIG. 6 is a generalized time plot of the suspend and resume signals sent over the microcontroller interface, in accordance with the present invention.

FIG. 5 is simplified block diagram illustrating the interface connections between the hub controller (28), as shown in FIG. 2, and a microcontroller (29). A bi-directional data link is provided between SDA pin of the hub controller (28) and SDA pin of the microcontroller (29). A one way link is provided from the following connections. The I²C™ clock signal sent from the SCL pin of the microcontroller (29) to the SCL pin of the hub controller (28). An interrupt request is sent from the /IRQO pin of the hub controller to the /IRQ pin of the microcontroller. The interrupt request is asserted whenever the hub controller needs attention from the microcontroller (29). The suspend signal is sent from the SUSPEND pin of the hub controller to the IN_PORT pin of the microcontroller to instruct the microcontroller to stop all I²C™ activity and assert the stop clock signal. The resume signal from the microcontroller is sent from the OUT_PORT pin of the microcontroller to the RESUMEI pin of the hub controller. The resume signal is used by the microcontroller to wake up the USB hub and the host computer in the suspend mode. The stop clock signal to stop the clock of the USB hub is sent from the OUT_PORT pin of the microcontroller to the STOPCLK pin of the hub controller. The USB reset signal is sent from the /USBRST pin of the hub controller to the IN_PORT pin of the microcontroller. The USB reset signal is asserted when the USB bus is in the reset state.

Both the SDA and SCL pins of the hub controller (19) are connected to the I²C™ slave interface bus (24) of the hub controller (19), as shown in FIG. 3. The remaining pins shown on the hub controller (28) of FIG. 5 are connected to the interrupt (25) of the hub controller (19) shown in FIG. 3.

FIG. 6 is a time plot of signals sent between the hub controller (28) and the microcontroller (29) using the interface shown in FIG. 5. The hub controller (28) sends a SUSPEND signal to the microcontroller (29) at a time $t_1$ in response to a suspend request from a host computer (not shown) connected to the hub controller. In response to this received SUSPEND request, the microcontroller asserts a STOPCLK signal to the hub controller at a time $t_2$. The microcontroller then enters the STOP, or powersave, mode. In this mode the CLK signal from the oscillator (23), shown in FIG. 3, is stopped at time $t_2$. At a time $t_3$ the microcontroller asserts a RESUMEI signal to the hub controller to wake up the USB hub (11). In response to the received RESUMEI signal, at time $t_4$ the hub controller de-asserts the SUSPEND signal sent to the microcontroller. In response, the microcontroller de-asserts the RESUMEI signal at time $t_5$ to the hub controller. Also at time $t_5$, in response to the de-assertion of the SUSPEND signal sent to the microcontroller, the microcontroller de-asserts the STOPCLK signal sent to the hub controller. The de-assertion of the STOPCLK signal causes the oscillator (23) of the hub controller to restart. In this manner, the microcontroller is able to wake up the USB hub through the interface despite the lack of a clock signal in the suspend mode.

Figure 7:
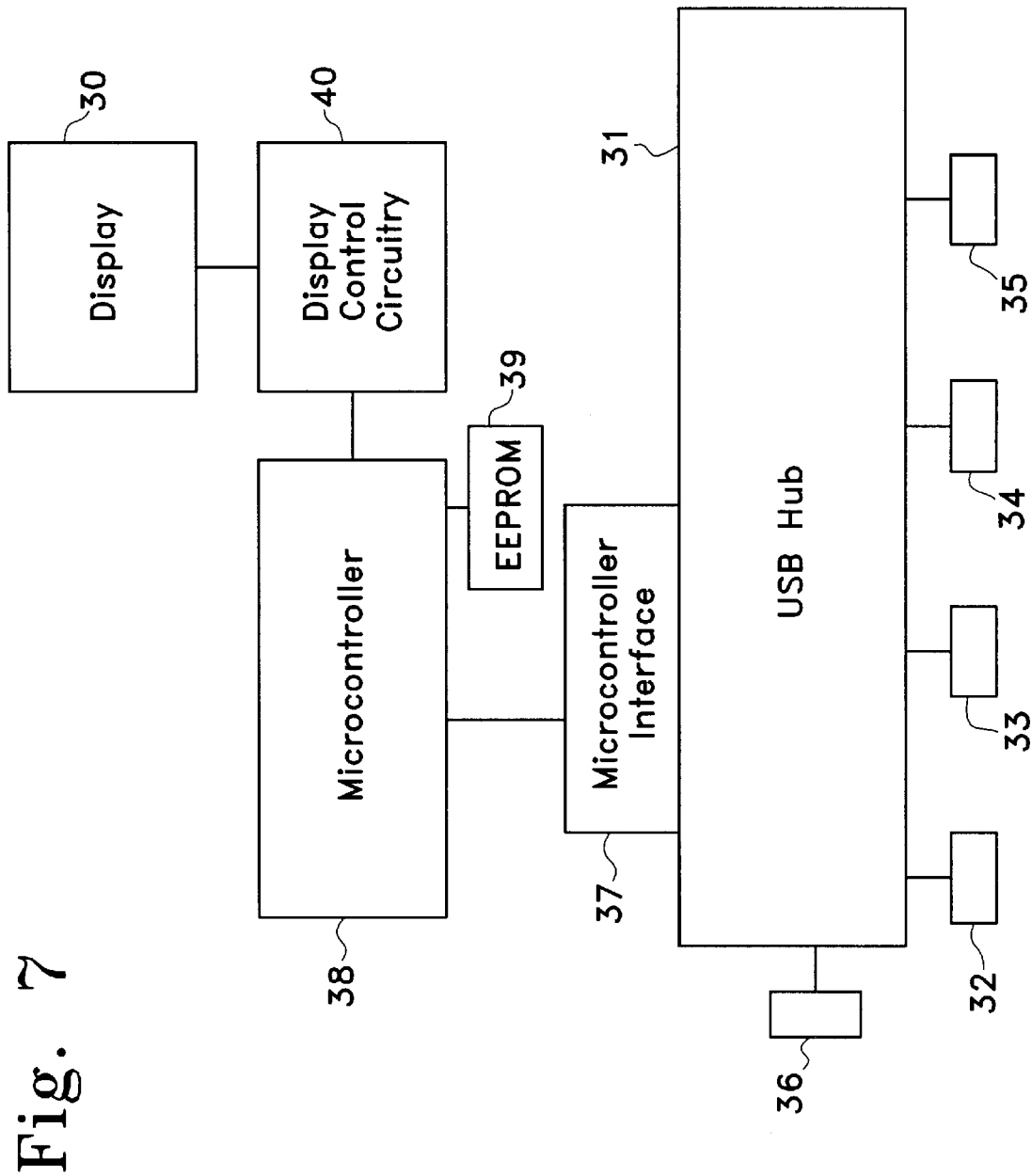
FIG. 7 is a generalized block diagram of a USB hub connected to a microcontroller controlled display through the microcontroller interface, in accordance with the present invention.

FIG. 7 is a generalized block diagram showing the application of the present invention with a microcontroller controlled display (30). The USB hub (31) has a plurality of downstream ports (32)–(35), an root port (36), and a microcontroller interface (37). The root port (36) connects to a host computer (not shown). The microcontroller interface (37) connects to a microcontroller (38). The microcontroller interface includes the I²C slave interface bus (not shown), the interrupt (not shown), and the connections for the oscillator (not shown). The microcontroller (38) connects to and electrically erasable programmable read only memory (EEPROM) (39), and to display control circuitry (40). The display control circuitry (40) is connected to the display (30). The display may be controlled by a remote control (not shown) by infra-red (IR) or other communications link to the display control circuitry (40).

While the above described embodiment has the USB hub connecting directly to a host computer, alternate embodiments of the present invention could connect to intermediate USB hubs, to a USB host controller, or to any allowable variation within the USB star topology.

Although the invention has been described in conjunction with particular embodiments, it will be appreciated that various modifications and alterations may be made by those skilled in the art without departing from the spirit and scope of the invention.

What is claimed is:

1. A method of controlling a USB hub by a microcontroller, comprising:
   sending a suspend request to the microcontroller from the USB hub;
   sending a stop clock request from the microcontroller to the USB hub in response to the suspend request; and
   stopping the USB hub controller clock in response to the stop clock request;
   entry into a powersave mode by the microcontroller in response to the suspend request.

2. The method of controlling a USB hub of claim 1, wherein a host computer sends a suspend request to the USB hub before the hub sends a suspend request to the microcontroller.

3. The method of controlling a USB hub of claim 1, wherein the microcontroller suspends all I²C signals before sending the stop clock request.

4. The method of controlling a USB hub of claim 1, further comprising:
   sending a resume request to the USB hub from the microcontroller;
   in response to the resume request de-asserting the suspend request sent from the hub to the microcontroller;

in response to the de-assertion of the suspend request de-asserting the stop clock request sent from the microcontroller to the USB hub;

restarting the clock of the USB hub in response to the de-asserting of the stop clock request; and exiting from the powersave mode by the microcontroller in response to the de-asserting of the suspend request.

5. The method of controlling a USB hub of claim 3, further comprising the step of sending a resume request to the hub from the microcontroller before the USB hub sends a resume request to the microcontroller.

6. The method of controlling a USB hub of claim 5, wherein the microcontroller receives an external wake up signal before the microcontroller sends a resume request to the USB hub.

7. The method of controlling a USB hub of claim 6, wherein the external wake up signal is an IR signal received from a hand held device.

8. A method of controlling a USB hub, the USB hub including a hub controller, a hub repeater and a microcontroller interface, comprising:

sending a SUSPEND signal to a microcontroller in response to a suspend request from a host computer connected to the hub controller;

sending a STOPCLK signal to the hub controller; and initiating a STOP mode in the hub controller in response to the received STOPCLK signal.

9. The method of controlling a USB hub of claim 8, further comprising:

sending a RESUMEI signal to the hub controller;

stopping the SUSPEND signal sent to the microcontroller in response to the received RESUMEI signal;

stopping the sending of the RESUMEI signal;

stopping the sending of the STOPCLK signal sent from the microcontroller in response to the stopping of the SUSPEND signal; and restarting the hub controller in response to the stopping of the STOPCLK signal.

* * * * *